Patented June 18, 1929.

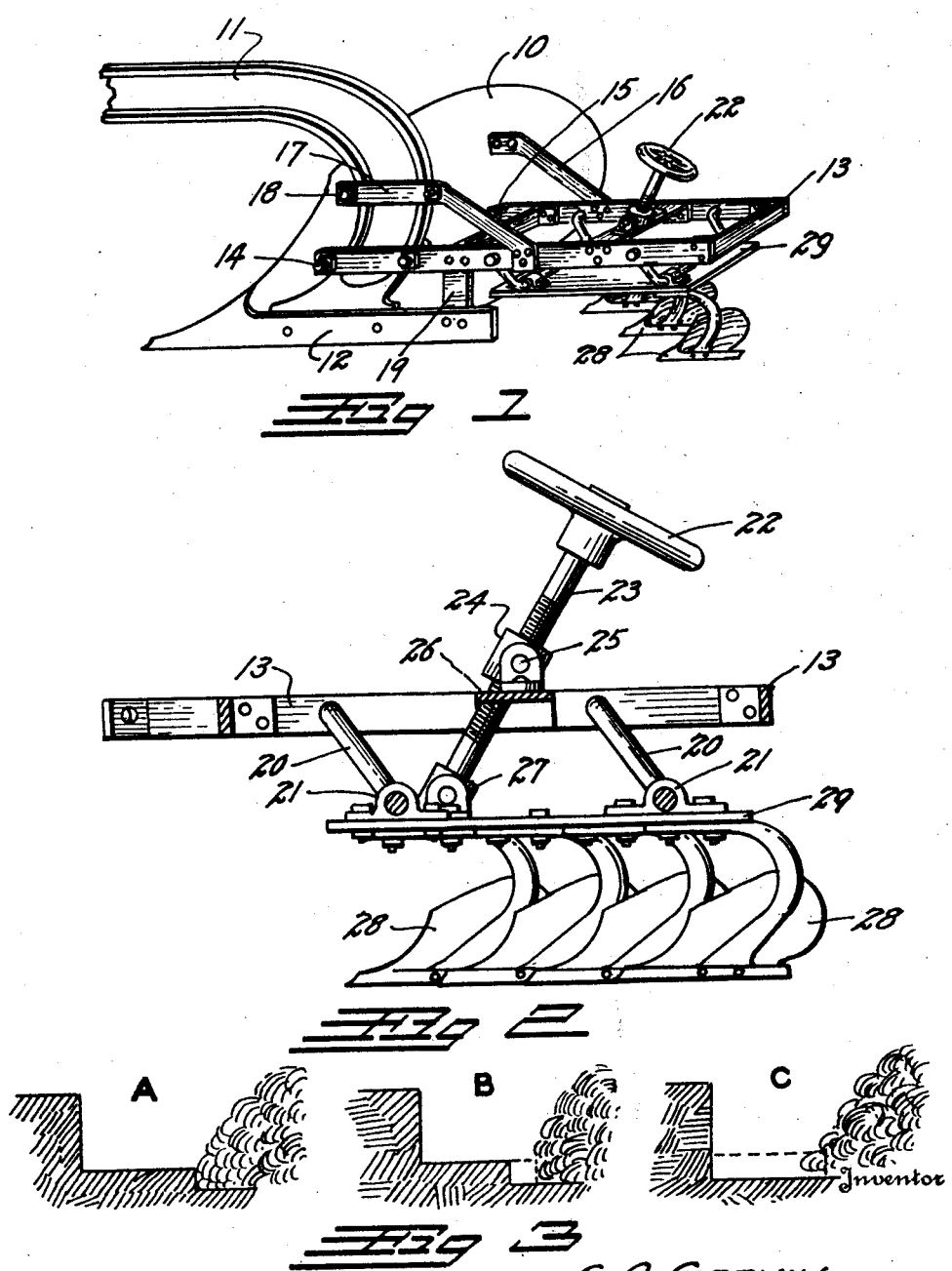

1,717,379

UNITED STATES PATENT OFFICE.

CECIL A. GARVIN, OF BUFFALO CREEK, COLORADO.

SUBSOILER ATTACHMENT FOR PLOWS.

Application filed June 4, 1928. Serial No. 282,550.

This invention relates to a subsoil plowing attachment for plows and has for its principal object the provision of a device which will deepen the furrow made by the main plow and yet will require but a minimum of additional tractive power, so that, at each plowing season the depth of turned earth will be increased.

In the hard "gumbo" soil of the midwestern United States it is practically impossible to force a large plow into the subsoil. With all the power available it is often impossible to cause a large plow to enter the subsoil more than two or three inches. This results in a surface plowing with a hard pan beneath which allows the sun to quickly dry the moisture from the turned soil and allows accumulated moisture to drain off over the hard pan, thus making it practically impossible to raise crops upon what is known in the West as "dryland".

With the use of this invention, however, at each plowing the subsoil plows are carried slightly below the main plow so that they will turn up and loosen a portion of this hard pan. At the next plowing, the main plow will travel at the depth formerly turned by the subsoil plows, allowing these plows to again turn up a deeper portion of the pan. In this way a few seasons plowings will prepare the earth to a relatively great depth where it will retain moisture and allow successful dry farming to be carried on.

Another object of the invention is to so construct the device that it can be easily and quickly attached to any ordinary plow and will not interfere with the ordinary use thereof.

A further object is to provide means whereby the depth of the subsoil plows can be quickly adjusted by the operator to suit the hardness of the ground and the power available.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective view illustrating my improved subsoil attachment connected with an ordinary plow.

Fig. 2 is an enlarged longitudinal section through the subsoil attachment.

Fig. 3 illustrates three typical cross sections through a furrow and indicates at "A", the furrow after the main plow has passed; at "B", the furrow after the first subsoil plow has passed and at "C", the furrow after all of the subsoil plows have passed.

In the drawing, the main plow mold board is indicated at 10, its beam at 11 and landside at 12. The invention comprises a fixed frame 13 which is secured to the plow beam 11 at one side by means of a suitable U bolt or clamp 14 and to the mold board 10 as indicated at 15. The frame 13 is supported at and braced by means of a mold board brace 16 riveted or bolted to the mold board 10 and a beam-brace 17 clamped or secured to the beam 11 by means of a U bolt 18. Increased rigidity can be provided by placing a strut 19 between the landside 12 and the frame 13.

Two bent hangers 20 have their ends journaled in the frame 13 and support a plow frame or plate 29 in journals 21. The height of the plow plate 29 can be regulated by means of a hand wheel 22 and threaded shaft 23. The shaft 23 is threaded into a nut 24 which is hinged at 25 upon a cross brace 26 in the frame 13. The lower extremity of the shaft 23 is rotatably secured in a universal socket 27 upon the plow plate 29. By rotating the hand wheel 22 the plow plate 29 may be drawn toward or pushed away from the fixed frame 13, causing the hangers 20 to rotate in their journals 21.

Secured to the lower face of the plow plate 29 are a series of angularly positioned subsoil plows 28. Each successive plow 28 is placed slightly to the rear and to one side of each preceding plow so that they will occupy a width substantially equal to the furrow width turned by the main plow 10. The first subsoil plow is positioned adjacent the mold board or outside of the furrow. The last subsoil plow is positioned so that it landside is substantially in alignment with the landside 12 of the main plow.

In use the most forward of the subsoil plows 28 travels along the outside of the furrow and acts to slice off a portion of the hard subsoil ledge at the landside of the previous furrow, as indicated at "B", Fig. 3. The first plow is then followed by the second which will slice another portion and widen the subsoil furrow until the last subsoil plow completely removes the block of subsoil below the main plow as indicated at "C", Fig. 3. It will be noted that each subsoil plow has but a narrow strip of subsoil to resist its turning so that but a minimum of power is required.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. A subsoil plowing attachment for main plows comprising: a fixed frame; means for securing said fixed frame to said main plow; a plow frame below said fixed frame; subsoil plows carried by said plow frame; means for varying the vertical height of said plow frame, said means comprising hangers hinged between said fixed frame and said plow frame; and means for rotating said hangers at their hinge points.

2. A subsoil plowing attachment for main plows comprising: a fixed frame; means for securing said fixed frame to said main plow; a plow frame below said fixed frame; subsoil plows carried by said plow frame; means for varying the vertical height of said plow frame, said means comprising hangers hinged between said fixed frame and said plow frame; and means for rotating said hangers at their hinge points, said means comprising a threaded shaft extending between said fixed frame and said plow frame.

3. A subsoil plowing attachment for main plows comprising: a fixed frame; means for securing said fixed frame to said main plow; a plow frame below said fixed frame; subsoil plows carried by said plow frame; means for varying the vertical height of said plow frame, said means comprising hangers hinged between said fixed frame and said plow frame; means for rotating said hangers at their hinge points, said means comprising a threaded shaft extending between said fixed frame and said plow frame; a hinged nut for said shaft carried by said fixed frame; and a universal joint for said shaft connected to said plow frame.

4. A subsoil attachment for a main plow comprising: a fixed frame; means for attaching said fixed frame to the beam of said plow at its one side and to said main plow at its other side; a brace extending from said plow beam to said fixed frame; a second brace extending from the mold board of said main plow to said fixed frame; a plow frame carried below said fixed frame; and subsoil plows carried by said plow frame.

5. A subsoil attachment for a main plow comprising: a fixed frame; means for attaching said fixed frame to the beam of said main plow at its one side and to said main plow at its other side; a brace extending from said plow beam to said fixed frame; a second brace extending from the mold board of said main plow to said fixed frame; a plow frame carried below said fixed frame; and subsoil plows carried by said plow frame, said subsoil plows being arranged in a diagonal line across the furrow of said main plow.

6. A subsoil attachment for a main plow comprising: a fixed frame; means for attaching said fixed frame to the beam of said main plow at its one side and to said main plow at its other side; a brace extending from said plow beam to said fixed frame; a second brace extending from the mold board of said main plow to said fixed frame; a vertically adjustable plow frame carried below said fixed frame; subsoil plows carried by said plow frame; and a threaded shaft extending between said fixed frame and said plow frame and adapted to vary the separation of said two frames.

In testimony whereof, I affix my signature.

CECIL A. GARVIN.